(12) United States Patent
Sato

(10) Patent No.: US 9,441,850 B2
(45) Date of Patent: Sep. 13, 2016

(54) AIR-CONDITIONING MANAGEMENT APPARATUS

(75) Inventor: Yasushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 14/114,924

(22) PCT Filed: Jun. 14, 2011

(86) PCT No.: PCT/JP2011/003370
§ 371 (c)(1),
(2), (4) Date: Oct. 31, 2013

(87) PCT Pub. No.: WO2012/172595
PCT Pub. Date: Dec. 20, 2012

(65) Prior Publication Data
US 2014/0081467 A1 Mar. 20, 2014

(51) Int. Cl.
*F24F 11/00* (2006.01)
*F24F 3/06* (2006.01)
*G05B 15/02* (2006.01)

(52) U.S. Cl.
CPC ............ *F24F 11/0086* (2013.01); *F24F 3/065* (2013.01); *F24F 11/006* (2013.01); *F24F 11/0009* (2013.01); *F24F 11/0012* (2013.01); *G05B 15/02* (2013.01); *G05B 2219/2642* (2013.01)

(58) Field of Classification Search
CPC ..................... F24F 11/0086; F24F 2011/0091
See application file for complete search history.

(56) References Cited

U.S. PATENT DOCUMENTS

| 6,199,390 B1* | 3/2001 | Mukohara ............ F24F 11/0086 236/94 |
| 7,664,574 B2* | 2/2010 | Imhof ..................... G05B 15/02 700/276 |
| 8,645,495 B2* | 2/2014 | Johnson ................. G05B 15/02 700/276 |

(Continued)

FOREIGN PATENT DOCUMENTS

| EP | 1 895 243 A2 | 3/2008 |
| JP | 64-054164 A | 3/1989 |

(Continued)

OTHER PUBLICATIONS

Machine Translation of JP2009174734A from https://dossier1.j-platpat.inpit.go.jp/tri/all/odse/ODSE_GM101_Top.action on Dec. 11, 2015.*

(Continued)

*Primary Examiner* — Kenneth M Lo
*Assistant Examiner* — David Wynne
(74) *Attorney, Agent, or Firm* — Posz Law Group, PLC

(57) ABSTRACT

An air-conditioning management apparatus is capable of selecting an air-conditioning device that affects an air-conditioning environment at a specific position in an air-conditioned space from a plurality of air-conditioning devices.

An area that is within an air-conditioned space to which a specific position P belongs in an arrangement plan and that is within a predetermined range from the specific position is obtained as a control target range. An air-conditioning device whose installation position in the arrangement plan is included in the control target range is selected as a control target air-conditioning device.

7 Claims, 13 Drawing Sheets

(56) References Cited

U.S. PATENT DOCUMENTS

| | | | | |
|---|---|---|---|---|
| 2008/0134087 | A1* | 6/2008 | Hoglund | F24F 11/0012 715/810 |
| 2009/0057425 | A1* | 3/2009 | Sullivan | F24F 11/0009 236/51 |
| 2009/0076779 | A1* | 3/2009 | Simmons | B60H 1/00642 703/1 |
| 2011/0083094 | A1* | 4/2011 | Laycock | F24F 11/0086 715/772 |
| 2012/0022702 | A1* | 1/2012 | Jang | F24F 11/006 700/277 |

FOREIGN PATENT DOCUMENTS

| | | |
|---|---|---|
| JP | 2001-304655 A | 10/2001 |
| JP | 2003-074946 A | 3/2003 |
| JP | 2007-315681 A | 12/2007 |
| JP | 2009-174734 A | 8/2009 |
| JP | 2009174734 * | 8/2009 ............. F24F 11/02 |
| JP | 2010-255954 A | 11/2010 |
| JP | 2010-261643 A | 11/2010 |

OTHER PUBLICATIONS

Office Action mailed Oct. 28, 2014 issued in corresponding JP patent application No. 2013-520298 (with English Translation).
Extended European Search Report dated Oct. 21, 2014 issued in corresponding EP patent application No. 11867673.3.
International Search Report of the International Searching Authority mailed Sep. 20, 2011 for the corresponding international application No. PCT/JP2011/003370 (with English translation).
"G-150AD Instruction Manual WT05495X02", manufactured by Mitsubishi Electric Co., Ltd., pp. 15-19, Nov. 2008 (Discussed on pp. 1-2 in the specification).

* cited by examiner

300 : AIR-CONDITIONING DEVICE POSITION INFORMATION

| AIR-CONDITIO-NING DEVICE ID | AIR-CONDITIONING DEVICE NAME | X-COORDINATE | Y-COORDINATE |
|---|---|---|---|
| 1 | LOBBY 1 | 300 | 700 |
| 2 | LOBBY 2 | 450 | 700 |
| 3 | LOBBY 3 | 350 | 600 |
| 4 | LOUNGE | 600 | 700 |
| 5 | CONFERENCE ROOM A | 300 | 300 |
| 6 | CONFERENCE ROOM B | 400 | 300 |
| ⋮ | | | |
| n | □□□ | x x x | y y y |

FIG. 5
(a)
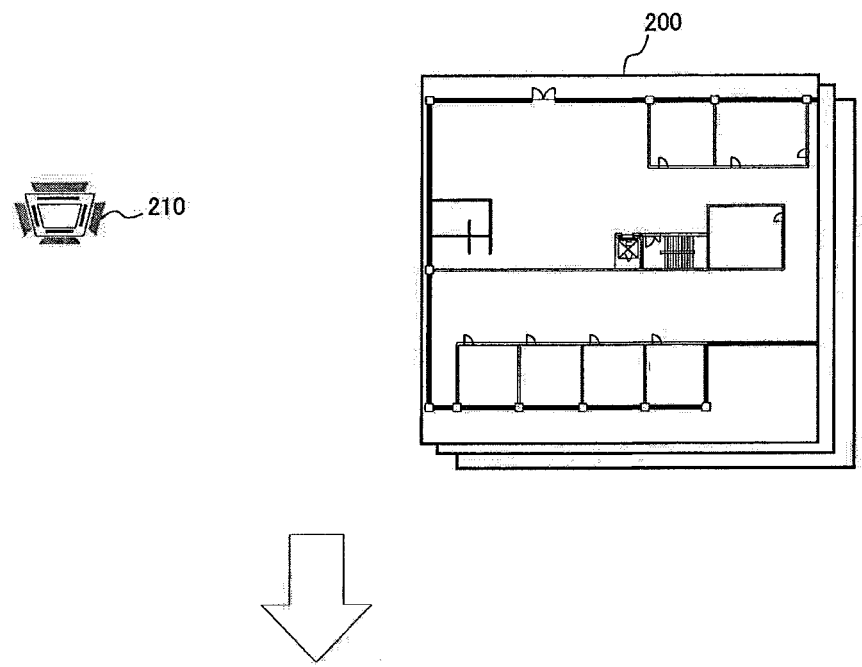
(b)
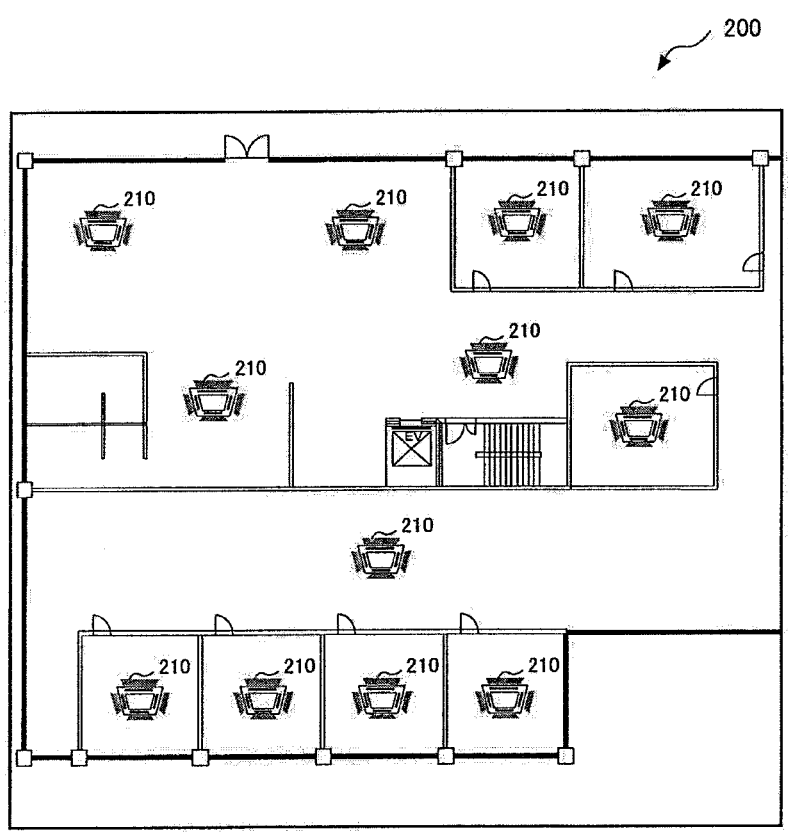

F I G. 6
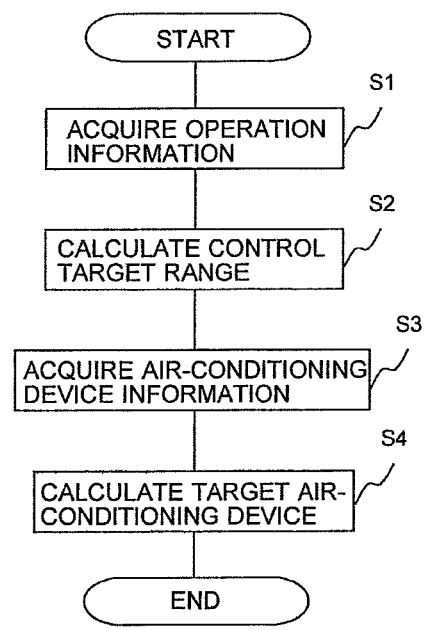

(a)

FIG. 8
(b)
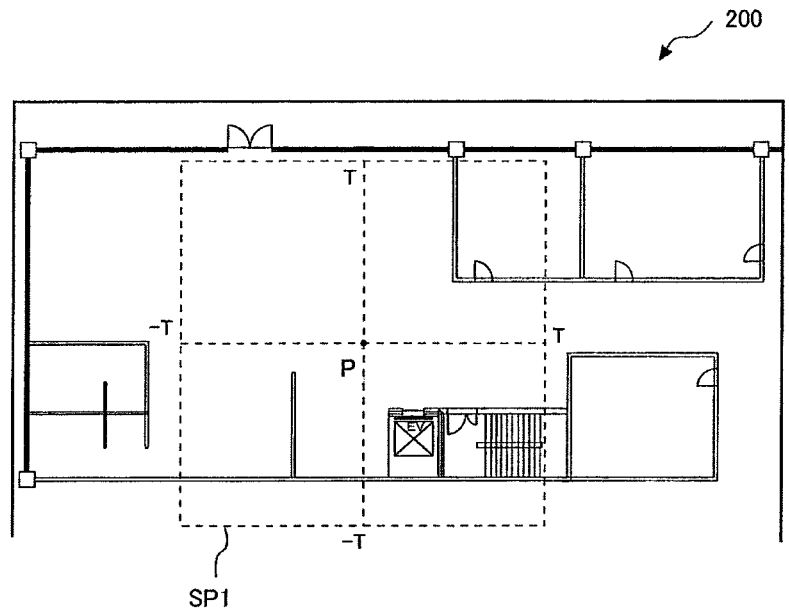
(c)
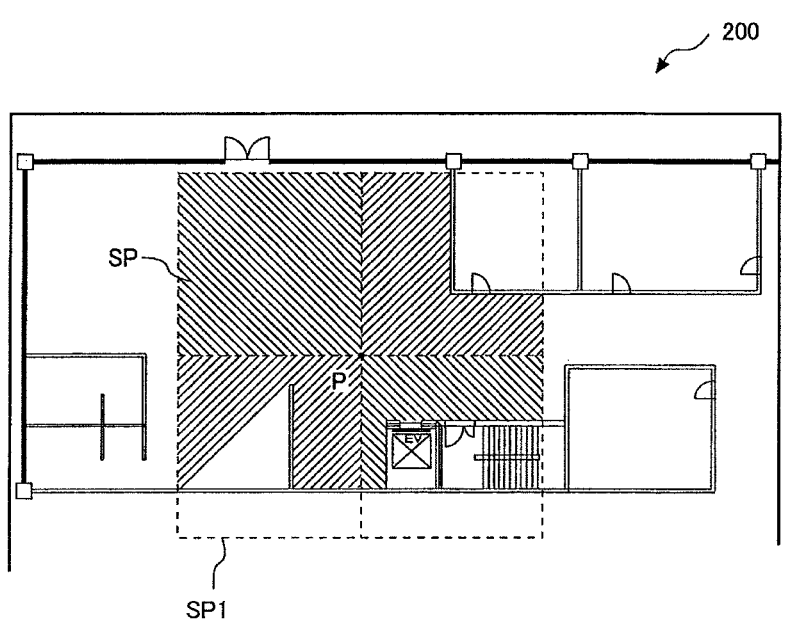

(d)

F I G. 1 2
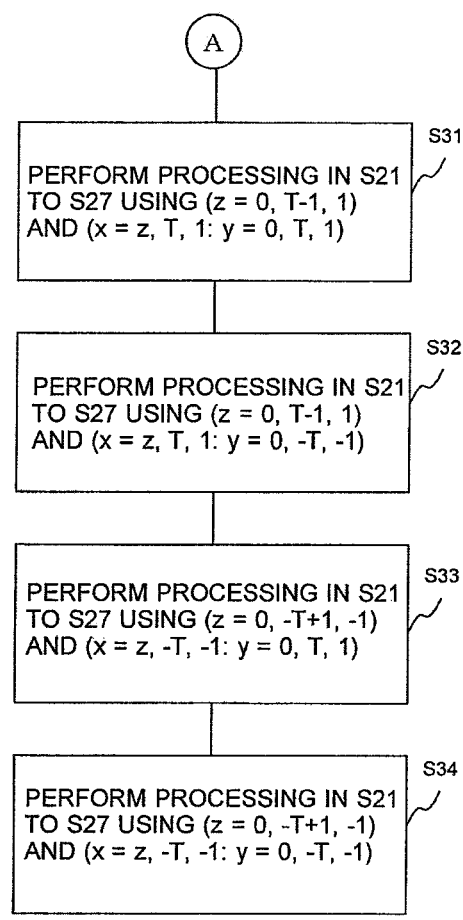

F I G. 1 3
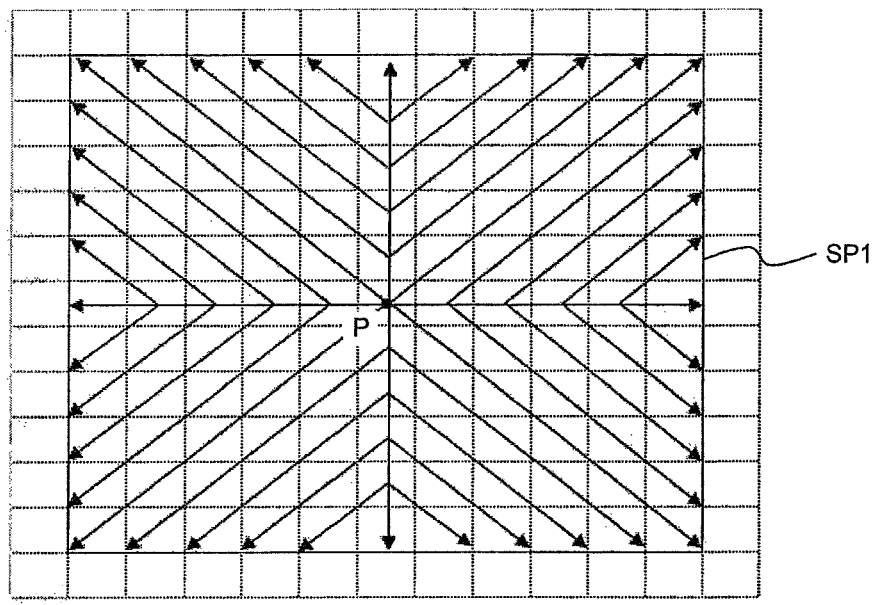
F I G. 1 4
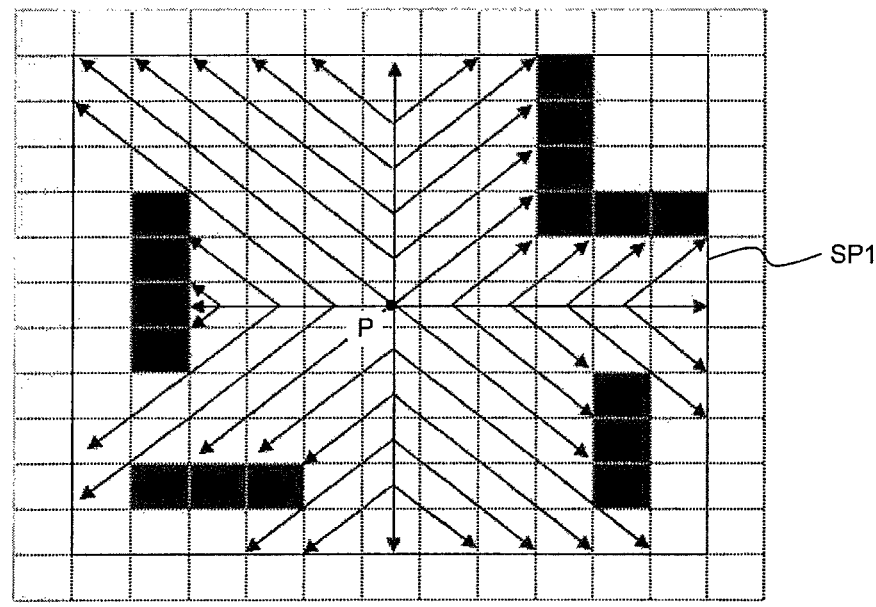

AIR-CONDITIONING MANAGEMENT APPARATUS

CROSS REFERENCE TO RELATED APPLICATION

This application is a U.S. national stage application of International Application No. PCT/JP2011/003370 filed on Jun. 14, 2011, the disclosure of which is incorporated by reference.

TECHNICAL FIELD

The present invention relates to an air-conditioning management apparatus controlling operations of plurality of air-conditioning devices.

BACKGROUND ART

In a structure, such as a building, it is preferable that a user recognizes the state of a target space to be managed and be enabled to operate an air-conditioning device as intended. As regards methods of achieving the above, for example, a method of displaying power consumption or a temperature acquired from an air-conditioning device to allow the user to recognize the state of a space and operate the air-conditioning device and a method of treating a plurality of air-conditioning devices as a group and operating the group have been developed.

For example, a "device management apparatus including a management screen that schematically displays the state of a space where a plurality of units is scattered and further schematically displays the states of the units in response to a simple operation" has been disclosed (refer to Patent Literature 1, for example).

Furthermore, for example, a technique to display the states of air-conditioning devices on a group-by-group basis has been disclosed. In addition, a technique to operate the air-conditioning devices on a group-by-group basis or collectively has been disclosed (refer to Non Patent Literature 1, for example).

CITATION LIST

Patent Literature

Patent Literature 1: Japanese Unexamined Patent Application Publication No. 2010-255954 (Abstract)

Non Patent Literature

Non Patent Literature 1: "G-150AD Instruction Manual WT05495×02" manufactured by Mitsubishi Electric Co., Ltd., pp. 15-19, November, 2008.

SUMMARY OF INVENTION

Technical Problem

As regards arrangement of air-conditioning devices in a structure, such as a building, a plurality of air-conditioning devices may be arranged in a single space (air-conditioned space). In many cases, the air-conditioning devices are arranged at regular intervals. Accordingly, there are places where there is no air-conditioning device in headroom. To condition air in such a space (position) where there is no air-conditioning device in headroom, air conditioning has to be performed by the air-conditioning devices arranged in the vicinity of this position.

It is therefore preferable to appropriately operate the air-conditioning devices which affect an air-conditioning environment (for example, temperature or humidity) at the position of the plurality of air-conditioning devices arranged in the air-conditioned space.

The related-art air-conditioning management apparatus issues an operation instruction only on a device-by-device basis. Disadvantageously, a user cannot select air-conditioning devices which significantly affect an air-conditioning environment in an intended space (position). Unfortunately, air conditioning cannot be performed as intended by the user.

Furthermore, the other air-conditioning management apparatus operates a previously set group of air-conditioning devices or operates all of the air-conditioning devices collectively. Disadvantageously, a space which is not intended by a user is subjected to air conditioning, thus reducing comfort in an indoor environment. Unfortunately, unnecessary air conditioning results in an increase in power consumption.

The present invention has been made to solve the above-described disadvantages and provides an air-conditioning management apparatus capable of selecting an air-conditioning device that affects an air-conditioning environment at a specific position in an air-conditioned space from the plurality of air-conditioning devices.

The invention further provides an air-conditioning management apparatus capable of allowing an air-conditioning environment at a specific position to be an air-conditioning environment desired by a user.

Solution to Problem

The present invention provides an air-conditioning management apparatus that controls operations of plurality of air-conditioning devices, the apparatus including a storage device configured to store information on an arrangement plan illustrating arrangement of one or plurality of air-conditioned spaces and air-conditioning device position information indicating installation positions of each of the air-conditioning devices in the arrangement plan, an input device configured to receive information on any specific position in the arrangement plan, a display device, and a controller configured to allow the display device to display the arrangement plan including the installation positions of each of the air-conditioning devices on the basis of the information on the arrangement plan and the air-conditioning device position information, and control an operation of an air-conditioning device selected as a control target air-conditioning device from the plurality of air-conditioning devices. The controller obtains, as a control target range, an area that is within the air-conditioned space to which the specific position belongs in the arrangement plan and that is within a predetermined range from the specific position, and selects at least one air-conditioning device whose installation position in the arrangement plan is included in the control target range as the control target air-conditioning device.

Advantageous Effects of Invention

According to the invention, an air-conditioning device affecting an air-conditioning environment at a specific position in an air-conditioned space can be selected from a plurality of air-conditioning devices.

BRIEF DESCRIPTION OF DRAWINGS

FIG. 5 includes diagrams illustrating a screen image of the arrangement plan in Embodiment 1.

FIG. 6 is a flowchart illustrating an operation of the air-conditioning management apparatus according to Embodiment 1.

FIG. 8 includes diagrams explaining the operation of selecting a control target air-conditioning device in Embodiment 1.

FIG. 12 is the flowchart illustrating the operation of calculating a control target range in Embodiment 1.

FIG. 13 is a schematic diagram illustrating pixel scanning directions in Embodiment 1.

FIG. 14 is a schematic diagram illustrating the pixel scanning directions in Embodiment 1.

DESCRIPTION OF EMBODIMENTS

Embodiment 1

Figure 1:
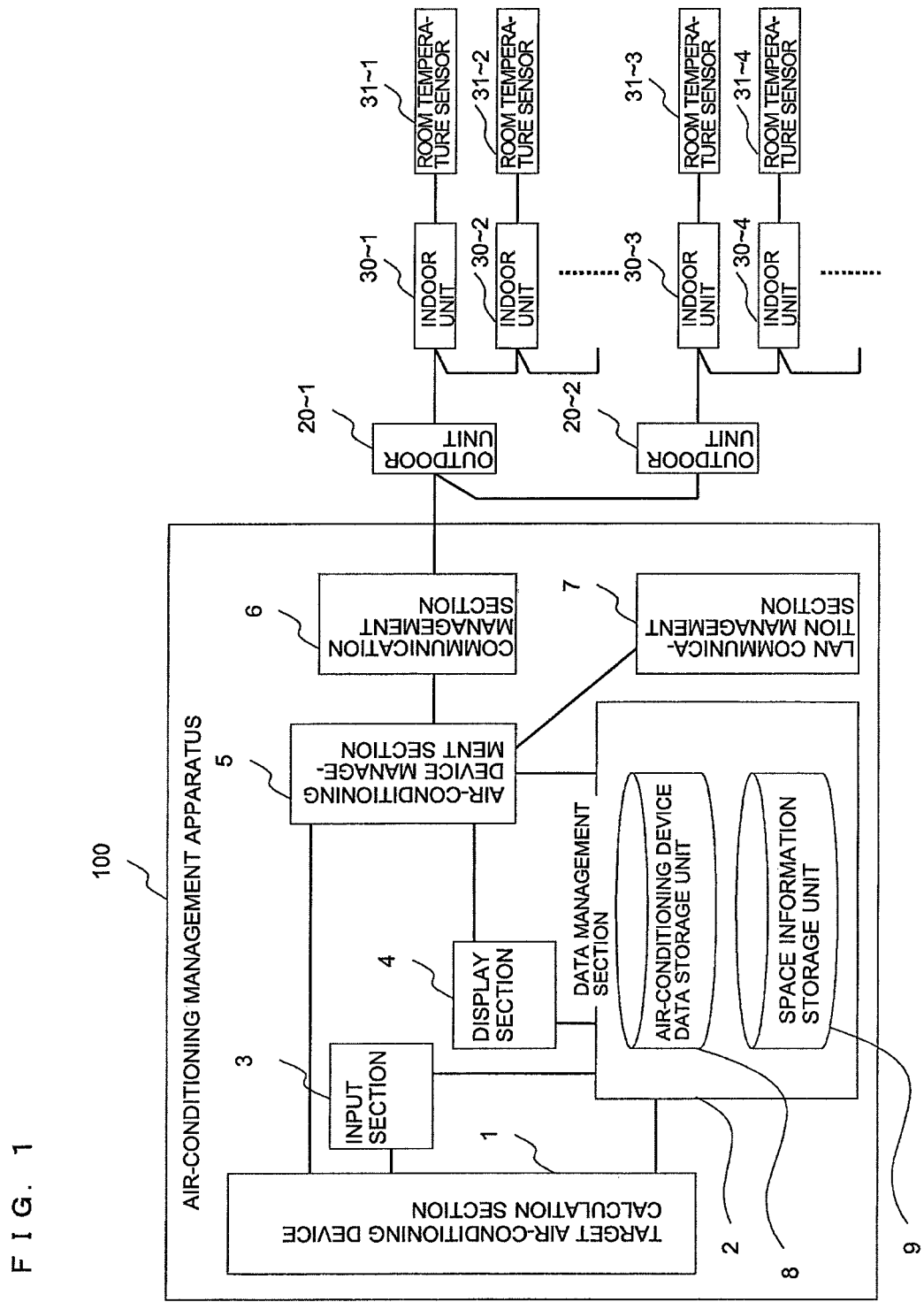
FIG. 1 is a block diagram illustrating a configuration of an air-conditioning management apparatus according to Embodiment 1.

FIG. 1 is a block diagram illustrating a configuration of an air-conditioning management apparatus according to Embodiment 1.

In FIG. 1, an air-conditioning management apparatus 100 is configured to control operations of a plurality of indoor units 30 (hereinafter, also referred to as "air-conditioning devices") and operations of corresponding outdoor units 20 in a centralized manner.

The air-conditioning management apparatus 100 is connected to the outdoor units 20 through dedicated communication lines or over a LAN. The air-conditioning management apparatus 100 can transmit and receive signals to and from the outdoor units 20.

Furthermore, each outdoor unit 20 is connected to the plurality of indoor units 30, serving as the air-conditioning devices, through dedicated communication lines or over the LAN. The air-conditioning management apparatus 100 can transmit and receive signals to and from each indoor unit 30 through the corresponding outdoor unit 20.

The air-conditioning management apparatus 100 can transmit a signal to control start and stop of an operation of each of at least the indoor units 30 and the outdoor units 20 to the corresponding one of the indoor units 30 and the outdoor units 20.

Furthermore, each of the indoor units 30 and the outdoor units 20 can transmit information indicating its operation state to the air-conditioning management apparatus 100.

The indoor units 30 each include a room temperature sensor 31 configured to detect a temperature (hereinafter, referred to as a "room temperature") of air sucked from a room in which the indoor unit 30 is disposed or a temperature at a specific position in the room. Each indoor unit 30 can transmit at least information on the room temperature to the air-conditioning management apparatus 100. The room temperature sensor 31 may be any sensor capable of measuring a temperature of a wall surface or a floor surface and the room temperature may be detected using such a sensor.

The air-conditioning management apparatus 100 includes a target air-conditioning device calculation section 1, a data management section 2, an input section 3, a display section 4, an air-conditioning device management section 5, a communication management section 6, and a LAN communication management section 7.

The target air-conditioning device calculation section 1, the air-conditioning device management section 5, and the LAN communication management section 7 may be realized by hardware, such as a circuit device, achieving functions of these units or can be realized by software implemented on an arithmetic unit, such as a microcomputer or a CPU.

The data management section 2 may be a memory device, such as an HDD (Hard Disk Drive) or a flash memory.

The input section 3 may be an input device, such as a touch panel.

The display section 4 may be an image output device, such as a liquid crystal display.

The communication management section 6 may be a network interface, such as a LAN interface.

The target air-conditioning device calculation section 1 is configured to calculate a control target air-conditioning device of the plurality of air-conditioning devices on the basis of information stored in the data management section 2 and information on a specific position (specific range) input from the input section 3. A calculation operation will be described in detail later.

The "target air-conditioning device calculation section 1" corresponds to a "controller" in the invention.

The data management section 2 is configured to store temperature data acquired from each indoor unit 30, environment information on an environment in which the indoor unit 30 is disposed, and installation information on the indoor unit 30. The environment information is previously set by a user and includes at least the dimension of the environment. Furthermore, the installation information of each indoor unit 30 is previously set by the user and includes at least information indicating a relative position in the installation environment. Detailed description will be made later.

The data management section 2 includes an air-conditioning device data storage unit 8 and a space information storage unit 9.

The "data management section 2" corresponds to a "storage device" in the invention.

The space information storage unit 9 is configured to store information on an arrangement plan 200 illustrating arrangement of one or a plurality of air-conditioned spaces.

Figure 2:
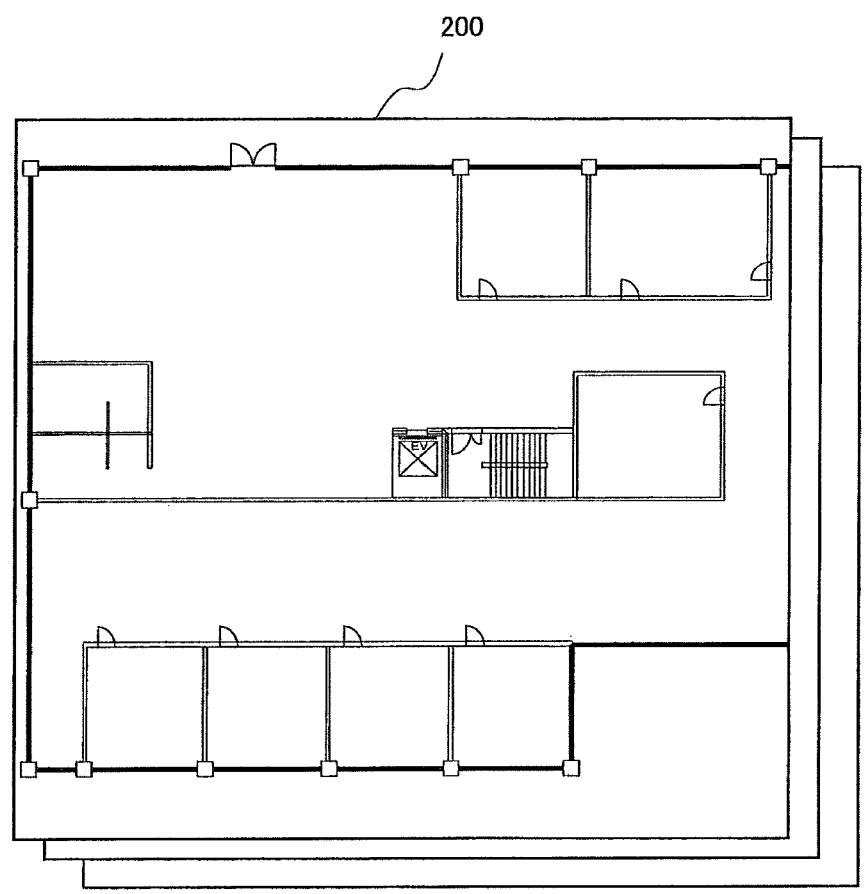
FIG. 2 is a diagram illustrating a configuration of an arrangement plan in Embodiment 1.

FIG. 2 is a diagram illustrating a configuration of an arrangement plan in Embodiment 1.

The arrangement plan 200 is a layout drawing (plan view) illustrating arrangement of one or the plurality of air-conditioned spaces where the air-conditioning devices are installed.

In the example illustrated in FIG. 2, the arrangement plan 200 is an image illustrating the shapes and positions of rooms, serving as air-conditioned spaces.

If a single air-conditioned space is disposed, the arrangement plan 200 may be an image illustrating only the shape of this space. In the arrangement plan 200, structural components, such as a passage, a window, a door, steps, and columns, arranged in the air-conditioned space may be illustrated and/or characters may be added. Furthermore, the arrangement plan 200 may be stored together with information on the dimension of the air-conditioned space.

As regards an image of the arrangement plan 200, the shape of an air-conditioned space and a boundary with another air-conditioned space are displayed in color. For example, a background of an air-conditioned space, such as a room, is colored in gray and structural components, such as walls and columns, are colored in white or black.

As regards coloring of the arrangement plan 200, for example, the brightness of each color of red (R), green (G), and blue (G) (hereinafter, referred to as "RGB") is set in the range of 0 to 255, so that a colored image can be used.

A plurality of arrangement plans 200 may be provided in proportion to the dimension of an air-conditioned space or the number of stories. Furthermore, the arrangement plan 200 is not limited to a plan view. Any diagram, such as a perspective view, may be used.

The air-conditioning device data storage unit 8 is configured to store, for example, position information on the position of the room temperature sensor 31 connected to each indoor unit 30, data about a room temperature acquired from the room temperature sensor 31 connected to each indoor unit 30. The air-conditioning device data storage unit 8 further stores air-conditioning device position information 300.

Figures 3, 4:
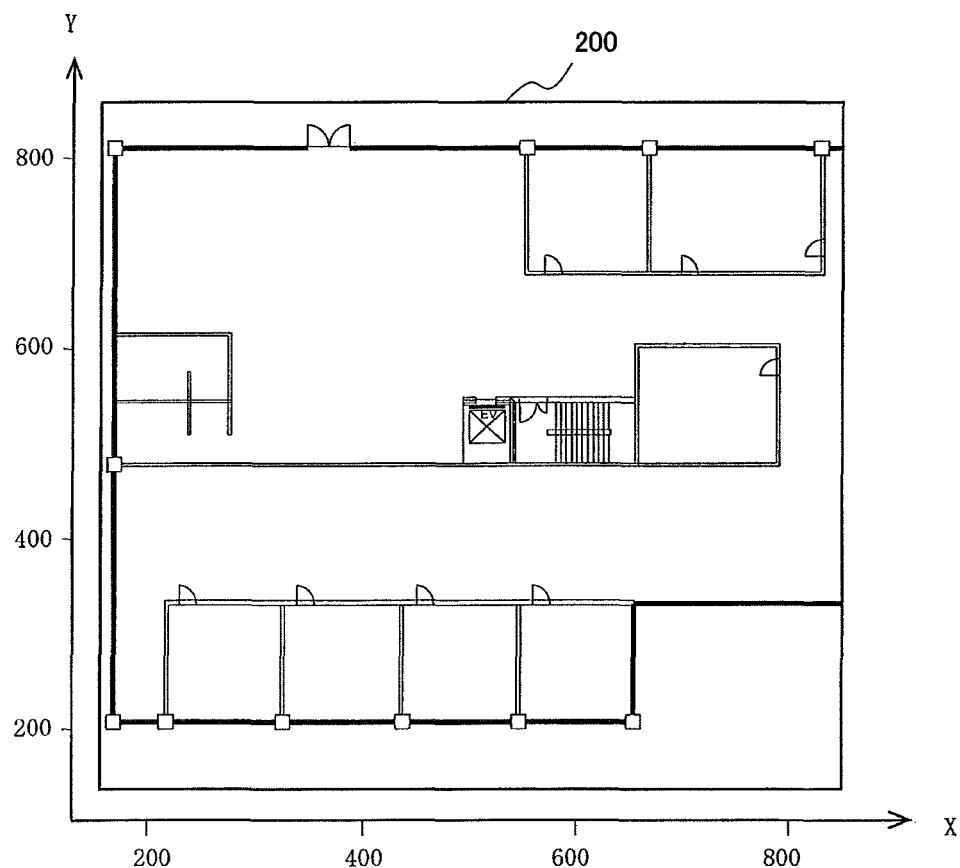
FIG. 3 is a diagram illustrating data structure of air-conditioning device position information in Embodiment 1.
FIG. 4 is a diagram explaining definitions of coordinates in Embodiment 1.

FIG. 3 is a diagram illustrating data structure of air-conditioning device position information in Embodiment 1.

The air-conditioning device position information 300 is information indicating installation positions of each of the air-conditioning devices in the arrangement plan 200.

Referring to FIG. 3, the air-conditioning device position information 300 includes air-conditioning device ID, a device name, an x-coordinate, and a y-coordinate.

The air-conditioning device ID is information to identify an air-conditioning device. For example, each air-conditioning device has a unique number as air-conditioning device ID.

An air-conditioning device name is assigned to each air-conditioning device and is based on, for example, the name of an air-conditioned space where the air-conditioning device is installed or a model. Information on the air-conditioning device name may be omitted.

The x-coordinate and the y-coordinate in the air-conditioning device position information 300 are information items specifying an installation position of an air-conditioning device in the arrangement plan 200. For example, referring to FIG. 4, a horizontal axis of the arrangement plan 200 is used as the x-axis, a vertical axis thereof is used as the y-axis, and pixels in the arrangement plan 200 are related to coordinates. For example, coordinates (x, y)=(200, 200) specify the position of a pixel located at a distance of 200 pixels from the left lower corner of a screen to the right and at a distance of 200 pixels therefrom in an upward direction.

The definitions of coordinates are not limited to the above example. Vector coordinates may be used.

Information indicating an installation position of an air-conditioning device is used as position information to display a figure (icon) representing the air-conditioning device in the arrangement plan 200. In addition, this information is used to select a control target air-conditioning device. Detailed description will be made later.

An air-conditioning device icon displayed in the arrangement plan 200 may be changed depending on type of air-conditioning device. In this case, for example, information (icon ID) to identify the type of icon may be stored in association with each air-conditioning device.

The input section 3 is configured to acquire operation information from the user. The input section 3 is configured to input information on any specific position in the arrangement plan 200.

The "input section 3" corresponds to an "input device" in the invention.

The display section 4 is configured to display, for example, operation data related to each of the air-conditioning devices stored in the air-conditioning device management section 5, operation data related to each indoor unit 30 and data about a room temperature related to the indoor unit 30 stored in the air-conditioning device data storage unit 8, and floor drawings stored in the space information storage unit 9.

The "display section 4" corresponds to a "display device" in the invention.

The communication management section 6 is configured to transmit and receive information to and from, for example, the outdoor units 20 and the indoor units 30 connected to the air-conditioning management apparatus 100.

The communication management section 6 transmits information from the air-conditioning device management section 5 to the air-conditioning devices connected to the air-conditioning management apparatus 100. In addition, the communication management section 6 receives information from, for example, the air-conditioning devices and transfers the information to the air-conditioning device management section 5.

The LAN communication management section 7 is configured to transmit and receive information to and from a device, such as a remote monitoring device (not illustrated), connected to the air-conditioning management apparatus 100 over the LAN (Local Area Network).

The air-conditioning device management section 5 is configured to manage operation data (for example, operation start, operation stop, operation of cooling or heating, air velocity, air flow rate, set temperature, and the like) related to the outdoor units 20 and the indoor units 30 connected to the air-conditioning management apparatus 100. The air-conditioning device management section 5 is connected to the communication management section 6, the LAN communication management section 7, the data management section 2, and the target air-conditioning device calculation section 1, and transmits the operation data to these units.

In addition, the air-conditioning device management section 5 allows the display section 4 to display the arrangement plan 200 and further display information related to the operation data in association with representations of the air-conditioning devices in the arrangement plan 200. A specific example will be described with reference to FIG. 5.

FIG. 5 includes diagrams illustrating a screen image of an arrangement plan in Embodiment 1.

For example, upon activation of the air-conditioning management apparatus 100 or in response to an operation by the user, an operation of displaying an arrangement plan is executed as follows.

(1) The air-conditioning device management section 5 reads the arrangement plan 200 stored in the data management section 2.

(2) The air-conditioning device management section 5 reads an air-conditioning device icon 210 related to each air-conditioning device ID from the data management section 2 with reference to the air-conditioning device position information 300 (FIG. 5(a)).

(3) The air-conditioning device management section 5 combines the read air-conditioning device icons 210 with the arrangement plan 200 on the basis of the x- and y-coordinates in the air-conditioning device position information 300 such that each air-conditioning device icon 210 is located at a position specified by the corresponding coordinates in the arrangement plan 200, thus generating the arrangement plan 200 in which the installation positions of each of the air-conditioning devices are represented (FIG. 5(b)).

(4) The air-conditioning device management section 5 allows the display section 4 to display the arrangement plan 200 in which the installation positions of each of the air-conditioning devices are represented.

If plurality of arrangement plans 200 is used, the user may perform an operation of selecting an arrangement plan 200 to be displayed and execute the above-described operation for the selected arrangement plan 200. A predetermined arrangement plan 200 may be previously selected.

The arrangement plan 200 is generated in this manner. Accordingly, even if the number of air-conditioning devices is increased or reduced by, for example, repair work, or even if the positions of the air-conditioning device are changed, the arrangement plan 200 can be easily corrected.

Although the case where the arrangement plan 200 is combined with the air-conditioning device icons 210 representing the air-conditioning devices has been described, the invention is not limited to the case. A drawing representing the air-conditioning devices in a layout previously illustrating an air-conditioned space may be used.

The "air-conditioning device management section 5" corresponds to a "controller" in the invention.

An operation of the air-conditioning management apparatus 100 according to Embodiment 1 will now be described.

An outline of the operation will now be described.

The user operates the input section 3 to enter information on any specific position P in the arrangement plan 200 displayed on the display section 4.

The target air-conditioning device calculation section 1 obtains, as a control target range SP, an area that is within an air-conditioned space to which the specific position P belongs in the arrangement plan 200 and that is within a predetermined range from the specific position P.

The target air-conditioning device calculation section 1 selects, as a control target air-conditioning device, an air-conditioning device whose installation position in the arrangement plan 200 is included in the control target range SP.

The air-conditioning device management section 5 controls an operation of the air-conditioning device selected as the target air-conditioning device.

The operation of the air-conditioning management apparatus 100 will be described in detail below with reference to FIGS. 2 to 5.

FIG. 6 is a flowchart illustrating the operation of the air-conditioning management apparatus according to Embodiment 1.

Figure 7:
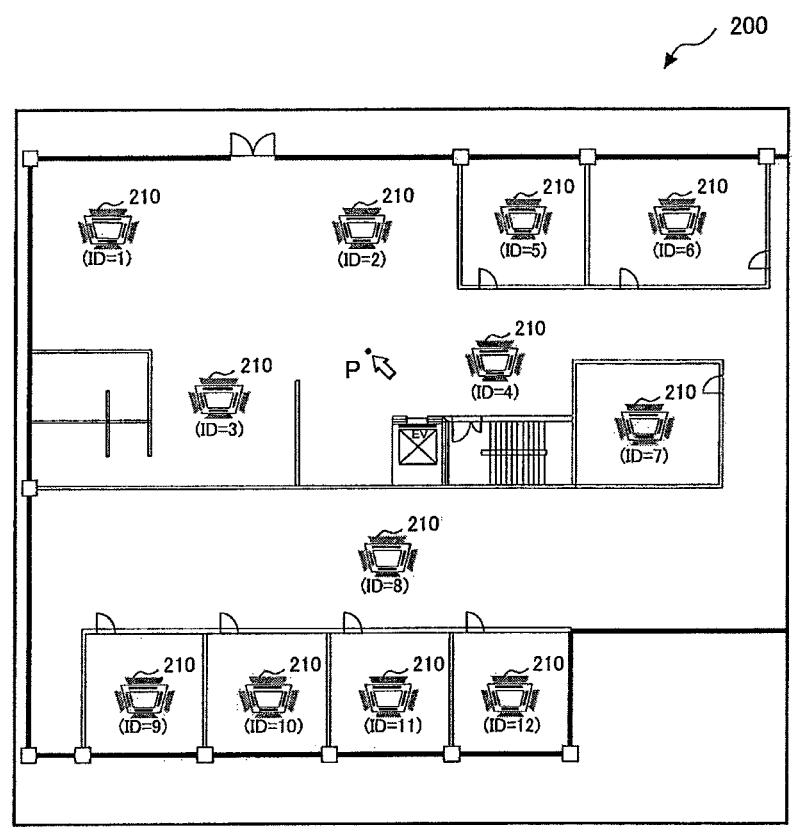
FIG. 7 is a diagram explaining an operation of selecting a control target air-conditioning device in Embodiment 1.
Figure 9:
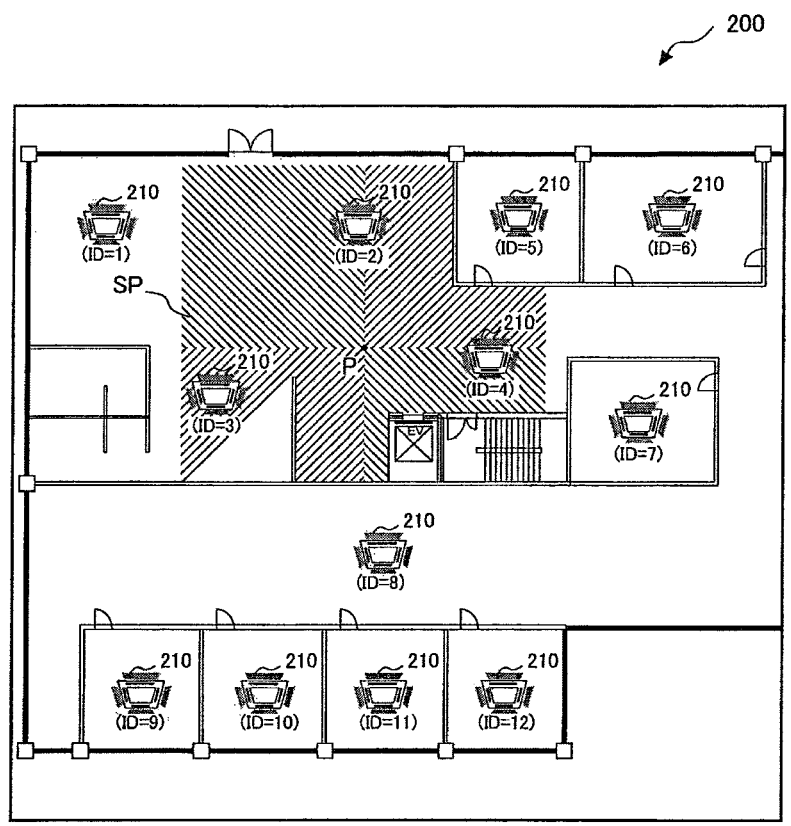
FIG. 9 is a diagram explaining the operation of selecting a control target air-conditioning device in Embodiment 1.

FIGS. 7 to 9 are diagrams explaining an operation of selecting a control target air-conditioning device in Embodiment 1.

The operation will be described below on the basis of steps in FIG. 6 with reference to (a) to (d) in FIGS. 7 to 9.

(S1) Acquisition of Operation Information

The user operates the input section 3 to input information on any position (specific position P), where the user intends to control an air-conditioning environment, in the arrangement plan 200 displayed on the display section 4 (FIG. 7(a)).

For example, if the input section 3 is a touch panel disposed at the front of the display section 4, the user presses the specific position P on the touch panel. Thus, coordinate information on the specific position P in the arrangement plan 200 is input to the target air-conditioning device calculation section 1.

The target air-conditioning device calculation section 1 acquires the information on the specific position P input by the user from the input section 3.

Although the case that the specific position P corresponds to a single point specified by coordinates is explained herein, the specific position P may correspond to a series of points specified by coordinates. Furthermore, any range (specific range), such as a range having a spread specified by coordinates, may be input.

If the position of a structural component, such as a wall or a column, or a space (outdoor space) outside an air-conditioned space is specific as a specific position P, such input may be rejected. For example, a background color of each air-conditioned space is unified into a predetermined color (e.g., gray). If the specific position P has a background color other than the predetermined color, the input is rejected.

(S2) Calculation of Control Target Range SP

The target air-conditioning device calculation section 1 then calculates a control target range SP.

A case where the target air-conditioning device calculation section 1 calculates the control target range SP on the basis of a display color at the specific position P in the arrangement plan 200 will be described as an example.

The target air-conditioning device calculation section 1 sets a range in which the specific position P obtained in the above-described step S1 is at equal distances corresponding to a predetermined constant T from all sides in the x-direction, the −x-direction, the y-direction, and the −y-direction to a temporary range SP1 to determine the control target range SP (FIG. 8(b)).

The range (temporary range SP1) in which the specific position P is at equal distances corresponding to the constant T from all sides in the ±x- and ±y-directions corresponds to a "predetermined range" in the invention.

The constant T may be variable. For example, the constant T can be set to any value by user operation. Furthermore, the constant T can be set depending on space position.

Although the case that the range defined by the constants T in the ±x- and ±y-directions is set to the predetermined range is described herein, the invention is not limited to the case. A range within a circle whose center coincides with the specific position P and has a radius T may be set to a predetermined range.

Furthermore, if information on any specific range, such as a range having a spread specified by coordinates, in the arrangement plan 200 is input in the above-described step S1, the specific range may be set to the temporary range SP1.

Furthermore, for example, information on a maximum distance at which air blown from each air-conditioning device reaches may be previously stored in air-conditioning device position information 300, the relationship between the maximum distance and a distance per pixel (dot) in the arrangement plan 200 in an air-conditioned space may be obtained, the number of dots corresponding to the reach of the air blown from the air-conditioning device may be obtained on the basis of the relationship, and the obtained number of dots may be set to the predetermined constant T. Thus, a range in which the specific position P is affected can be set to the control target range SP depending on capacity of the air-conditioning device.

The target air-conditioning device calculation section 1 analyzes display color information related to the arrangement plan 200 with respect to the ±x-axis directions, the ±y-axis directions, and y=±x-directions from the specific position P in the temporary range SP1, and determines a range (same air-conditioned space range) having the same color as that at the specific position P as the control target range SP (FIG. 8(*c*)).

In other words, the target air-conditioning device calculation section 1 obtains, as the control target range SP, an area that is within the air-conditioning target space to which the specific position P belongs in the arrangement plan 200 and that is within the predetermined range from the specific position P.

Such an operation will be described in detail with reference to FIGS. 10 to 12.

Figure 10:
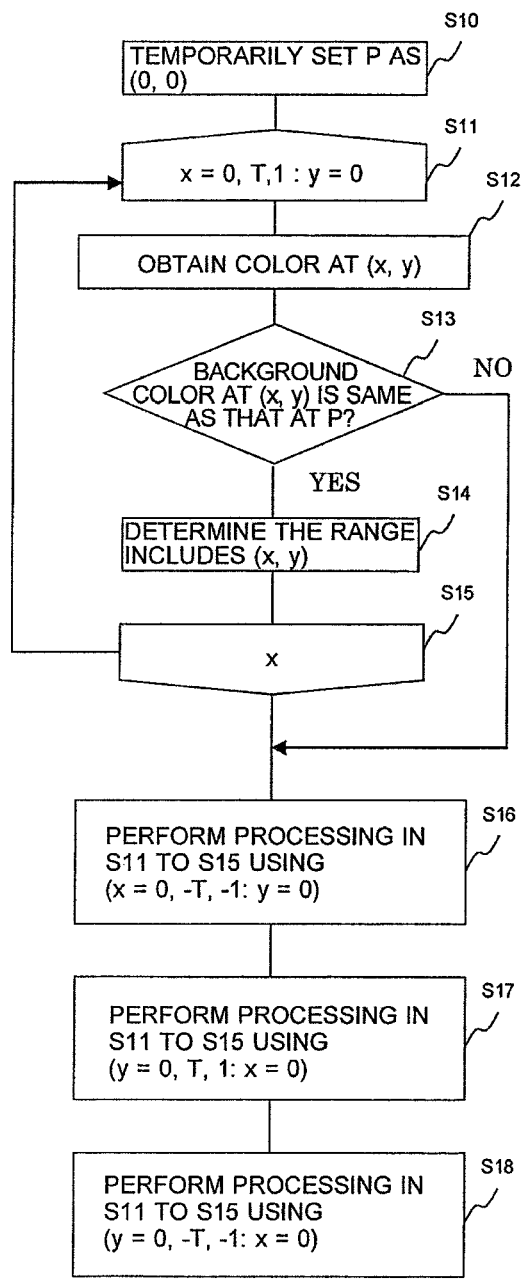
FIG. 10 is a flowchart illustrating an operation of calculating a control target range in Embodiment 1.

FIG. 10 is a flowchart illustrating an operation of calculating a control target range in Embodiment 1.

The operation of calculating the control target range SP in the ±x-axis directions and the ±y-axis directions from the specific position P will be described below on the basis of steps in FIG. 10.

(S10)

The target air-conditioning device calculation section 1 temporarily sets coordinates specifying the specific position P as (0, 0).

(S11 to S15)

The target air-conditioning device calculation section 1 performs repeated processing using an initial value x=0, a final value +T, an increment of +1, and y=0 (fixed value).

In the repeated processing in S11 to S15, the target air-conditioning device calculation section 1 obtains a background color at coordinates (x, y) relative to the specific position P, serving as a reference (origin), in the arrangement plan 200 (S12) and determines whether the obtained background color at the coordinates (x, y) is the same as that at the specific position P (S13).

Although the determination as to whether the background color at coordinates (x, y) is the same as that at the specific position P is described herein as an example, the invention is not limited to this example. It is only required that a structural component, such as a wall or a column, can be distinguished from an air-conditioned space in the arrangement plan 200. For example, information on the colors of structural components, such as a wall and a column, may be preset such that the color at the coordinates (x, y) is not the same as those of the structural components.

If the background color at the coordinates (x, y) is the same as that at the specific position P, the target air-conditioning device calculation section 1 determines that the coordinates (x, y) are included in the control target range SP (S14). The target air-conditioning device calculation section 1 increments the x-coordinate by +1 and repeats the above-described processing until the x-coordinate reaches the final value T (S15).

On the other hand, if the background color at the coordinates (x, y) is not the same as that at the specific position P, the target air-conditioning device calculation section 1 exits from the repeated processing and proceeds to step S16.

According to such processing, the target air-conditioning device calculation section 1 determines whether the pixels (dots) in the +x-direction from the specific position P on the dots in the arrangement plan 200 have the same color as the background color at the specific position P and sets a range having the same color as the background color to the control target range SP.

The user may set the background color of the arrangement plan 200. Furthermore, the background color is not limited to one color. The colors of RGB may be allowed to have a wide range of set values.

Furthermore, a color of the largest number of dots of colors used in an image of the arrangement plan 200 may be automatically set to the background color.

(S16)

The target air-conditioning device calculation section 1 performs repeated processing similar to that in the above-described steps S11 to S15 using the initial value x=0, a final value −T, an increment of −1, and y=0 (fixed value).

In this repeated processing, the target air-conditioning device calculation section 1 determines whether the pixels (dots) in the −x-direction from the specific position P of the dots in the arrangement plan 200 have the same color as the background color at the specific position P and sets a range having the same color as the background color to the control target range SP.

(S17)

The target air-conditioning device calculation section 1 performs repeated processing similar to that in the above-described steps S11 to S15 using an initial value y=0, the final value +T, an increment of 1, and x=0 (fixed value).

In this repeated processing, the target air-conditioning device calculation section 1 determines whether the pixels (dots) in the +y-direction from the specific position P of the dots in the arrangement plan 200 have the same color as the background color at the specific position P and sets a range having the same color as the background color to the control target range SP.

(S18)

The target air-conditioning device calculation section 1 performs repeated processing similar to that in the above-described steps S11 to S15 using the initial value y=0, the final value −T, an increment of −1, and x=0 (fixed value).

In this repeated processing, the target air-conditioning device calculation section 1 determines whether the pixels (dots) in the −y-direction from the specific position P of the dots in the arrangement plan 200 have the same color as the background color at the specific position P and sets a range having the same color the background color to the control target range SP.

Figure 11:
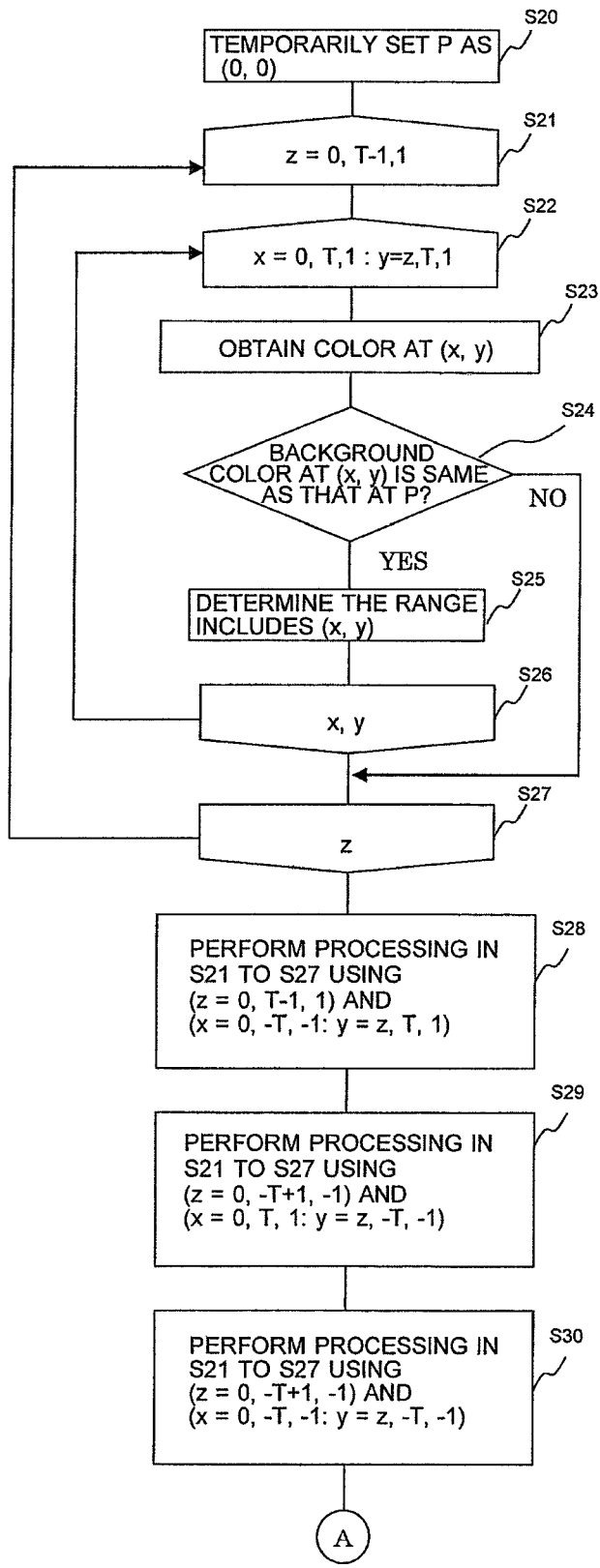
FIG. 11 is a flowchart illustrating the operation of calculating a control target range in Embodiment 1.

FIGS. 11 and 12 correspond to a flowchart illustrating the operation of calculating a control target range in Embodiment 1.

The operation of calculating the control target range SP in the y=±x-directions (hereinafter, also referred to as "oblique directions") from the specific position P will be described below with reference to steps in FIGS. 11 and 12.

(S20)

The target air-conditioning device calculation section 1 temporarily sets coordinates specifying the specific position P as (0, 0).
(S21 to S27)

The target air-conditioning device calculation section 1 performs repeated processing on a variable z using an initial value z=0, a final value T−1, and an increment of +1.
(S22 to S26)

Furthermore, the target air-conditioning device calculation section 1 performs repeated processing on variables x and y using the initial value x=0, the final value +T, and an increment of +1 for the variable x and using an initial value y z, the final value +T, and an increment of +1 for the variable y.

In the repeated processing in S22 to S26, the target air-conditioning device calculation section 1 obtains a background color at coordinates (x, y) relative to the specific position P, serving as a reference (origin), in the arrangement plan 200 (S23) and determines whether the obtained background color at the coordinates (x, y) is the same as that at the specific position P (S24).

Although the determination as to whether the background color at coordinates (x, y) is the same as that at the specific position P is described herein as an example, the invention is not limited to this example. It is only required that a structural component, such as a wall or a column, can be distinguished from an air-conditioned space in the arrangement plan 200. For example, information on the colors of structural components, such as a wall and a column, may be preset such that the color at the coordinates (x, y) is not the same as those of the structural components.

If the background color at the coordinates (x, y) is the same as that at the specific position P, the target air-conditioning device calculation section 1 determines that the coordinates (x, y) are included in the control target range SP (S25). The target air-conditioning device calculation section 1 increments each of the x- and y-coordinates by +1 and repeats the above-described processing until the x- and y-coordinates each reaches the final value T.

On the other hand, if the background color at the coordinates (x, y) is not the same as that at the specific position P, the target air-conditioning device calculation section 1 proceeds to step S27 and increments the z-coordinate by +1 and repeats the above-described processing until the z-coordinate reaches the final value T−1.

According to such processing, the target air-conditioning device calculation section 1 determines whether the pixels (dots) in a range where x=0 to T and y=z to T (and z=0 to T−1) in an oblique direction from the specific position P of the dots in the arrangement plan 200 have the same color as the background color at the specific position P and sets a range having the same color as the background color to the control target range SP.

The user may set the background color of the arrangement plan 200. Furthermore, the background color is not limited to one color. The colors of RGB may be allowed to have a wide range of set values.

Furthermore, a color of the largest number of dots of colors used in the image of the arrangement plan 200 may be automatically set to the background color.
(S28)

The target air-conditioning device calculation section 1 performs repeated processing similar to that in the above-described steps S21 to S27 using the initial value z=0, the final value T−1, and an increment of +1 for the variable z, using the initial value x=0, the final value −T, and an increment of −1 for the variable x, and using the initial value y=z, the final value +T, and an increment of +1 for the variable y.

According to such processing, the target air-conditioning device calculation section 1 determines whether the pixels (dots) in a range where x=0 to −T and y=z to T (and z=0 to T−1) in an oblique direction from the specific position P of the dots in the arrangement plan 200 have the same color as the background color at the specific position P and sets a range having the same color as the background color to the control target range SP.
(S29)

The target air-conditioning device calculation section 1 performs repeated processing similar to that in the above-described steps S21 to S27 using the initial value z=0, a final value −T+1, and an increment of −1 for the variable z, using the initial value x=0, the final value +T, and an increment of +1 for the variable x, and using the initial value y=z, the final value −T, and an increment of −1 for the variable y.

According to such processing, the target air-conditioning device calculation section 1 determines whether the pixels (dots) in a range where x=0 to T and y=z to −T (and z=0 to −T+1) in an oblique direction from the specific position P of the dots in the arrangement plan 200 have the same color as the background color at the specific position P and sets a range having the same color as the background color to the control target range SP.
(S30)

The target air-conditioning device calculation section 1 performs repeated processing similar to that in the above-described steps S21 to S27 using the initial value z=0, the final value −T+1, and an increment of −1 for the variable z, using the initial value x=0, the final value −T, and an increment of −1 for the variable x, and using the initial value y=z, the final value −T, and an increment of −1 for the variable y.

According to such processing, the target air-conditioning device calculation section 1 determines whether the pixels (dots) in a range where x=0 to −T and y=z to −T (and z=0 to −T+1) in an oblique direction from the specific position P of the dots in the arrangement plan 200 have the same color as the background color at the specific position P and sets a range having the same color as the background color to the control target range SP.
(S31)

The target air-conditioning device calculation section 1 performs repeated processing similar to that in the above-described steps S21 to 327 using the initial value z=0, the final value T−1, and an increment of +1 for the variable z, using an initial value x=z, the final value +T, and an increment of +1 for the variable x, and using the initial value y=0, the final value and an increment of +1 for the variable y.

According to such processing, the target air-conditioning device calculation section 1 determines whether the pixels (dots) in a range where x=z to T and y=0 to T (and z=0 to T−1) in an oblique direction from the specific position P of the dots in the arrangement plan 200 have the same color as the background color at the specific position P and sets a range having the same color as the background color to the control target range SP.
(S32)

The target air-conditioning device calculation section 1 performs repeated processing similar to that in the above-described steps S21 to S27 using the initial value z=0, the final value T−1, and an increment of +1 for the variable z, using the initial value x=z, the final value +T, and an increment of +1 for the variable x, and using the initial value y=0, the final value −T, and an increment of −1 for the variable y.

According to such processing, the target air-conditioning device calculation section 1 determines whether the pixels (dots) in a range where x=z to T and y=0 to −T (and z=0 to T−1) in an oblique direction from the specific position P of the dots in the arrangement plan 200 have the same color as the background color at the specific position P and sets a range having the same color as the background color to the control target range SP.

(S33)

The target air-conditioning device calculation section 1 performs repeated processing similar to that in the above-described steps S21 to S27 using the initial value z=0, the final value −T+1, and an increment of −1 for the variable z, using the initial value x=z, the final value −T, and an increment of −1 for the variable x, and using the initial value y=0, the final value +T, and an increment of +1 for the variable y.

According to such processing, the target air-conditioning device calculation section 1 determines whether the pixels (dots) in a range where x=z to −T and y=0 to T (and z=0 to −T+1) in an oblique direction from the specific position P of the dots in the arrangement plan 200 have the same color as the background color at the specific position P and sets a range having the same color as the background color to the control target range SP.

(S34)

The target air-conditioning device calculation section 1 performs repeated processing similar to that in the above-described steps S21 to S27 using the initial value z=0, the final value −T+1, and an increment of −1 for the variable z, using the initial value x=z, the final value −T, and an increment of −1 for the variable x, and using the initial value y=0, the final value −T, and an increment of −1 for the variable y.

According to such processing, the target air-conditioning device calculation section 1 determines whether the pixels (dots) in a range where x=z to −T and y=0 to −T (and z=0 to −T+1) in an oblique direction from the specific position P of the dots in the arrangement plan 200 have the same color as the background color at the specific position P and sets a range having the same color as the background color to the control target range SP.

The pixels within the temporary range SP1 in the arrangement plan 200 are scanned in the ±x-axis directions, the ±y-axis directions, and the y=±x-directions from the specific position P by the above-described operation of FIGS. 10 to 12, thus determining the control target range SP.

The directions in which the pixels are scanned by the above-described operation are schematically illustrated in FIGS. 13 and 14.

FIGS. 13 and 14 are schematic diagrams illustrating the pixel scanning directions in Embodiment 1.

As illustrated in FIG. 13, in cases where there is no representation corresponding to a structural component, such as a wall or a column, within the temporary range SP1 and the background color is the same as that at the specific position P, all of the pixels in the temporary range SP1 are determined as being within the control target range SP.

On the other hand, in cases where there are representations corresponding to structural components, such as walls and columns, within the temporary range SP1 as illustrated in black in FIG. 14, when a pixel displayed in black is detected during scanning of the pixels as indicated by each arrow, a scanned range (indicated by the arrow) is determined as a control target range SP and scanning is not performed any further.

As described above, an area behind each structural component, such as a wall or a column, relative to the specific position P is not determined as a control target range SP. Consequently, a room different from the room (air-conditioned space) to which the specific position P belongs and an area where a structural component makes air blown from an air-conditioning device difficult to reach in the same room as the room to which the specific position P belongs in the temporary range SP1 can be excluded from the control target range SP.

If a series of points specified by coordinates is input as information on the specific position P in the above-described step S1 the operation described with reference to FIGS. 10 to 12 is performed for each of the points specified by the coordinates.

(S3) Acquisition of Air-conditioning Device Information

Explanation will be made with reference again to FIG. 6.

The target air-conditioning device calculation section 1 refers to the air-conditioning device position information 300 in the data management section 2 and acquires information on installation positions of each of the air-conditioning devices in the arrangement plan 200.

Furthermore, the target air-conditioning device calculation section 1 acquires the latest operation data (for example, operation start, operation stop, operation of cooling or heating, air velocity, air flow rate, and set temperature) related to each of the air-conditioning devices from the air-conditioning device management section 5.

(S4) Calculation of Target Air-conditioning Device

The target air-conditioning device calculation section 1 selects, as a control target air-conditioning device, an air-conditioning device whose installation position is included in the control target range SP on the basis of the control target range SP calculated in step S2 and the information on the installation positions of each of the air-conditioning devices acquired in step S3.

For example, referring to (d) in FIG. 9, the coordinates specifying the installation positions of each of the air-conditioning devices having the air-conditioning device IDs "2", "3", and "4" are included in the coordinates of the control target range SP. Accordingly, the three air-conditioning devices are selected as control target air-conditioning devices.

Note that an air-conditioning device whose installation position is included in the control target range SP may be excluded from the control target air-conditioning devices on the basis of the operation data related to each of the air-conditioning devices acquired in step S3. For example, the following control may be performed. A table illustrating the relationship between an air flow rate of each air-conditioning device, air blowing direction thereof, and the distance between the position of the air-conditioning device specified by the coordinates and the specific position P is previously stored. If the air flow rate or the air blowing direction is below a reference value, the relevant air-conditioning device is excluded from the target air-conditioning devices.

The air-conditioning device management section 5 controls an operation of each control target air-conditioning device selected in the above-described processing.

For example, assuming that the user intends to start air conditioning at the specific position P, the user inputs an instruction to start air conditioning together with information on the specific position P through the input section 3.

The air-conditioning device management section 5 starts the operation of each air-conditioning device selected in the above-described processing to start air conditioning at the specific position P.

Furthermore, for example, assuming that the user intends to change a room temperature at the specific position P to an intended temperature, the user inputs information on a set temperature together with the information on the specific position through the input section 3. The air-conditioning device management section 5 calculates an average of room temperatures detected by the air-conditioning devices selected in the above-described processing and controls the operations of the control target air-conditioning devices so that the room temperature is dose to the input set temperature.

As described above, controlling the operations of the air-conditioning devices significantly affecting an air-conditioning environment at the specific position P ensures that the air-conditioning environment at the specific position P is as intended by the user.

As described above, according to Embodiment 1, an area that is within an air-conditioned space to which a specific position P belongs in the arrangement plan 200 and that is within a predetermined range from the specific position P is obtained as a control target range SP, and an air-conditioning device whose installation position in the arrangement plan 200 is included in the control target range SP is selected as a control target air-conditioning device.

Consequently, an air-conditioning device affecting an air-conditioning environment at the specific position in the air-conditioned space can be selected from plurality of air-conditioning devices.

As described above, a group of air-conditioning devices is not controlled. An air-conditioning device that affects a specific position P specified by the user can be calculated and an indoor environment can therefore be changed as intended by the user. Thus, the comfort of the indoor environment can be improved.

Furthermore, it is only required that the user performs an operation of selecting a specific position P. Accordingly, ease of operation can be achieved, thus improving efficiency of operation.

Additionally, since an air-conditioning device affecting an air-conditioning environment at a specific position P is selected, an operation of maintaining a temperature at the specific position P constant can be easily achieved. Maintaining the temperature at the specific position P intended by the user constant as described above results in a reduction in air conditioning load, thus reducing energy consumption.

Furthermore, a space that the user does not intend to perform air conditioning is not subjected to air conditioning. Thus, the comfort of the indoor environment can be improved. Additionally, unnecessary air conditioning is avoided, thus reducing power consumption.

In Embodiment 1, an arrangement plan 200 is image information that represents the shape of an air-conditioned space and a boundary with another air-conditioned space in color. The target air-conditioning device calculation section 1 obtains a control target range on the basis of a display color at a specific position in the arrangement plan 200.

Consequently, a control target air-conditioning device can be selected on the basis of the information on the arrangement plan 200 in which installation positions of air-conditioning devices are represented. It is unnecessary to provide additional information to select a control target air-conditioning device.

Embodiment 2

According to Embodiment 2, in addition to the operations according to Embodiment 1, a selected control target air-conditioning device is automatically operated so as to increase or reduce a set temperature on the basis of information on a temperature at a specific position P and an operation mode of the air-conditioning device.

The configuration of the air-conditioning management apparatus 100 and the operation of selecting a control target air-conditioning device in Embodiment 2 are the same as those in Embodiment 1. The same components as those in Embodiment 1 are specific by the same reference numerals.

Figure 15:
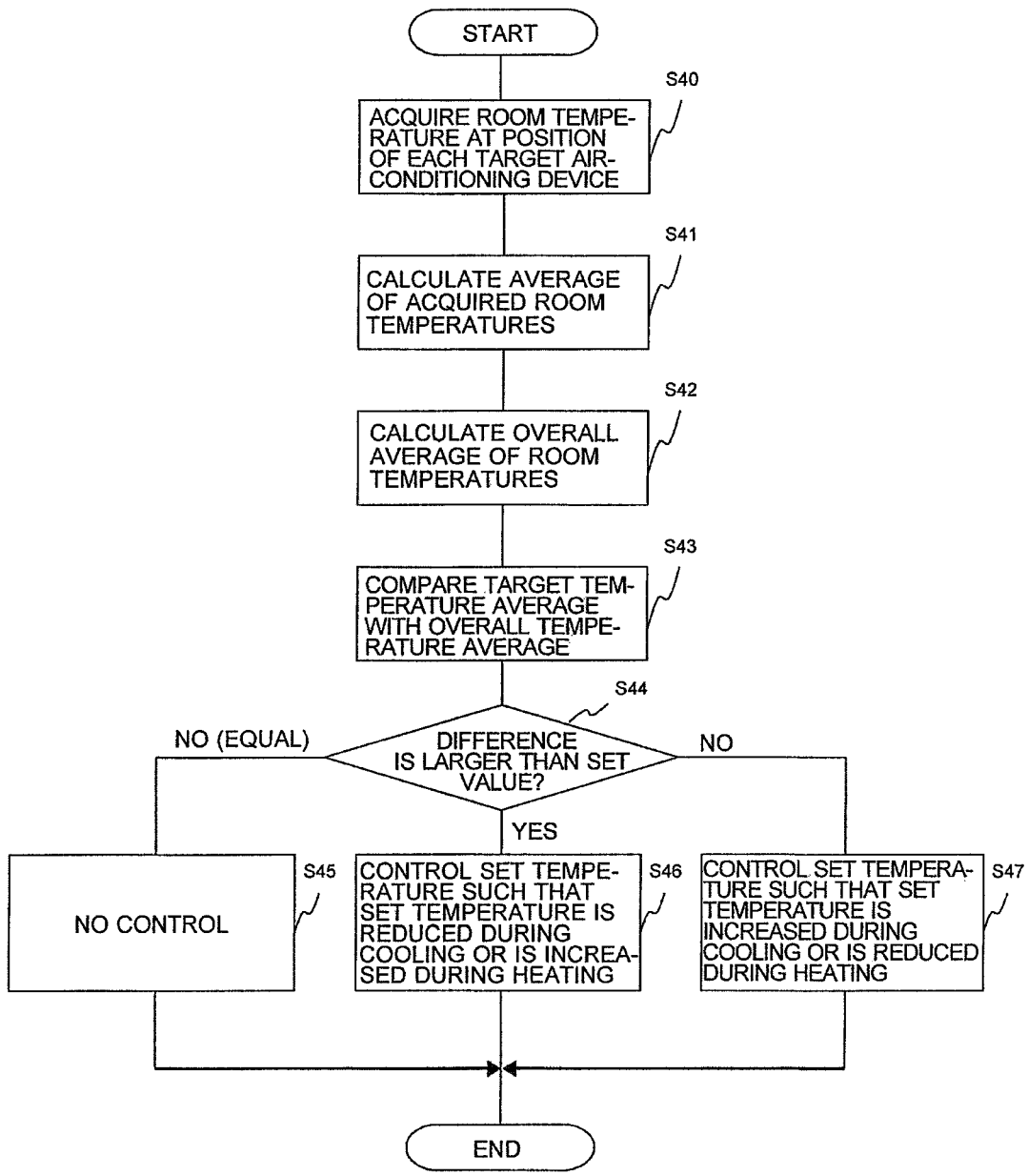
FIG. 15 is a flowchart illustrating an operation of an air-conditioning management apparatus according to Embodiment 2.

FIG. 15 is a flowchart illustrating an operation of an air-conditioning management apparatus according to Embodiment 2.

In Embodiment 2, a control target air-conditioning device is selected and, after that, a temperature associated with the control target air-conditioning device is controlled.

Explanation will be made below with reference to steps in FIG. 15.

(S40)

The air-conditioning device management section 5 acquires information on a room temperature from each of control target air-conditioning devices selected by the foregoing operation in Embodiment 1.

(S41)

The air-conditioning device management section 5 calculates an average (hereinafter, referred to as a "target temperature average") of room temperatures detected by the control target air-conditioning devices on the basis of the acquired room temperatures. Since the control target air-conditioning devices significantly affect an air-conditioning environment at a specific position P, the average of the room temperatures detected by the control target air-conditioning devices can be regarded as a temperature at the specific position P.

(S42)

The air-conditioning device management section 5 acquires room temperatures detected by all of the air-conditioning devices to be controlled by the air-conditioning management apparatus 100 and calculates an average (hereinafter, referred to as an "overall temperature average") of the room temperatures of all of the air-conditioning devices.

(S43)

The air-conditioning device management section 5 compares the target temperature average calculated in step S41 with the overall temperature average calculated in step S41 to obtain the difference between the averages.

(S44)

The air-conditioning device management section 5 compares the difference between the target temperature average and the overall temperature average obtained in step S43 with a predetermined set value.

The predetermined set value may be a preset value or may be a value set by an input operation from the user. For example, a large value may be set on condition that a fluctuation in temperature difference between the specific position P and its surrounding environment is permitted.

(S45)

If the target temperature average is equal to the overall temperature average (the difference is zero) in the above-described step S44, the air-conditioning device management section 5 maintains an operation of each control target air-conditioning device as it is, namely, does not perform any particular control.

(S46)

If the difference between the target temperature average and the overall temperature average is larger than the set value in the above-described step S44, the air-conditioning device management section 5 controls the operation of each control target air-conditioning device such that the target temperature average is close to the overall temperature average.

Specifically, while each control target air-conditioning device performs a cooling operation, the air-conditioning device is controlled so as to reduce a set temperature. While the control target air-conditioning device performs a heating operation, the air-conditioning device is controlled so as to increase a set temperature.

(S47)

If the difference between the target temperature average and the overall temperature average is smaller than the set value in the above-described step S44, the air-conditioning device management section 5 controls the operation of each control target air-conditioning device such that the target temperature average is close to the overall temperature average.

Specifically, while each control target air-conditioning device performs the cooling operation, the air-conditioning device is controlled so as to increase a set temperature. While the control target air-conditioning device performs the heating operation, the air-conditioning device is controlled so as to reduce a set temperature.

With the above-described operation, the air-conditioning device management section 5 grasps the difference in temperature between the specific position P and the surrounding environment and performs a process of achieving uniformity in temperature between the specific position P and the surrounding environment by automatically increasing or reducing a set temperature.

Although the target temperature average is compared with the overall temperature average in the above-described operation, the invention is not limited to such a case. For example, a certain temperature input by the user may be used instead of the overall temperature average and the operation of each control target air-conditioning device may be controlled such that the target temperature average is close to the certain temperature.

Furthermore, although whether to increase or reduce the set temperature is determined on the basis of only the comparison between room temperatures by processing in steps S43 to S47 in the above-described operation, the user may be enabled to set a difference in temperature between room temperatures and an increment or decrement of set temperature. For example, the operation may be performed as follows. If the difference between room temperatures is 4 degrees C., the set temperature is changed by 1 degree C.

As described above, according to Embodiment 2, the operation of each control target air-conditioning device is controlled on the basis of room temperatures detected by the control target air-conditioning devices.

Accordingly, if the plurality of air-conditioning devices is installed in a single air-conditioned space, a room temperature at a specific position P intended by the user can be changed to an intended temperature. Consequently, an air-conditioning environment at the specific position P can be set to an air-conditioning environment intended by the user.

According to Embodiment 2, the operation of each control target air-conditioning device is controlled so that the average of room temperatures detected by the control target air-conditioning devices is close to the average of room temperatures detected by the plurality of air-conditioning devices.

Accordingly, target air-conditioning devices are selected and, after that, a temperature is changed depending on surrounding environment, thus achieving uniformity in the environment. In addition, maintaining a temperature at the specific position P constant results in a reduction in air conditioning load, thus reducing energy consumption.

Although only temperature control has been described as an example in Embodiment 2, air may be blown to a specific position. Furthermore, an air flow rate may be increased or reduced depending on the difference in temperature. Needless to say, the invention may include a variety of modifications of these examples.

REFERENCE SIGNS LIST 1, target air-conditioning device calculation section; 2, data management section; 3, input section; 4, display section; 5, air-conditioning device management section; 6, communication management section; 7, LAN communication management section; 8, air-conditioning device data storage unit; 9, space information storage unit; 20, outdoor unit; 30, indoor unit; 31, room temperature sensor; 100, air-conditioning management apparatus; 200, arrangement plan; 210, air-conditioning device icon; and 300, air-conditioning device position information.

The invention claimed is:

1. An air-conditioning management apparatus that controls operations of a plurality of air-conditioning devices, the air-conditioning management apparatus comprising:
a storage device configured to store information on an arrangement plan illustrating arrangement of one or a plurality of air-conditioned spaces and air-conditioning device position information indicating installation positions of each of the air-conditioning devices in the arrangement plan;
an input device configured to receive information on any specific position in the arrangement plan;
a display device; and
a controller configured to allow the display device to display the arrangement plan indicating the installation positions of each of the air-conditioning devices on a basis of the information on the arrangement plan and the air-conditioning device position information, and control an operation of an air-conditioning device selected as a control target air-conditioning device from the plurality of air-conditioning devices, wherein
the information on the arrangement plan is image information representing a shape of each air-conditioned space and a boundary with another air-conditioned space in color, and
the controller is further configured to
obtain, as a control target range, an area that is within a predetermined range from the specific position within the air-conditioned space to which the specific position belongs in the arrangement plan, the area being determined by scanning in an oblique direction from the specific position in the arrangement plan in which the color in the arrangement plan corresponds to a display color at the specific position, and
select at least one air-conditioning device whose installation position in the arrangement plan is included in the control target range as the control target air-conditioning device.

2. The air-conditioning management apparatus of claim 1, wherein the controller sets the predetermined range on a basis of a reach of air blown from each air-conditioning device.

3. The air-conditioning management apparatus of claim 1, wherein the input device receives information on any specific range in the arrangement plan, and
wherein the controller sets the predetermined range on a basis of the specific range received through the input device.

4. The air-conditioning management apparatus of claim 1, further comprising:
an air-conditioning device management section configured to acquire information on a room temperature detected by each air-conditioning device,
wherein the controller controls an operation of each control target air-conditioning device on a basis of room temperatures detected by the control target air-conditioning devices.

5. The air-conditioning management apparatus of claim 4, wherein the controller controls the operation of each control target air-conditioning device such that an average of room temperatures detected by the control target air-conditioning devices is close to an overall average of room temperatures detected by the plurality of air-conditioning devices.

6. The air-conditioning management apparatus of claim 1, wherein the controller is further configured to compare a color associated with the specific position to a color associated with the control target range.

7. The air-conditioning management apparatus of claim 6, wherein the controller selects a control target air conditioning device upon a condition that the color associated with the control target range, in which the control target air conditioning device is located, matches the color associated with the specific position.

* * * * *